United States Patent
Jiang et al.

(10) Patent No.: US 11,199,839 B2
(45) Date of Patent: Dec. 14, 2021

(54) METHOD OF REAL TIME VEHICLE RECOGNITION WITH NEUROMORPHIC COMPUTING NETWORK FOR AUTONOMOUS DRIVING

(71) Applicant: HRL Laboratories, LLC, Malibu, CA (US)

(72) Inventors: Qin Jiang, Oak Park, CA (US); Youngkwan Cho, Los Angeles, CA (US); Nigel D. Stepp, Santa Monica, CA (US); Steven W. Skorheim, Canoga Park, CA (US); Vincent De Sapio, Westlake Village, CA (US); Praveen K. Pilly, West Hills, CA (US); Ruggero Scorcioni, New York, NY (US)

(73) Assignee: HRL Laboratories, LLC, Malibu, CA (US)

( * ) Notice: Subject to any disclaimer, the term of this patent is extended or adjusted under 35 U.S.C. 154(b) by 321 days.

(21) Appl. No.: 16/519,814

(22) Filed: Jul. 23, 2019

(65) Prior Publication Data

US 2020/0026287 A1  Jan. 23, 2020

Related U.S. Application Data

(60) Provisional application No. 62/702,042, filed on Jul. 23, 2018.

(51) Int. Cl.
*G05D 1/00* (2006.01)
*G05B 13/00* (2006.01)
(Continued)

(52) U.S. Cl.
CPC ......... *G05D 1/0088* (2013.01); *G05B 13/027* (2013.01); *G05D 1/0231* (2013.01); *G05D 2201/0213* (2013.01)

(58) Field of Classification Search
CPC ............... G05D 1/0088; G05D 1/0231; G05D 2201/0213; G05D 1/00; G05B 13/027;
(Continued)

(56) References Cited

U.S. PATENT DOCUMENTS 10,338,594 B2 * 7/2019 Long .................. G06K 9/00798
10,369,974 B2 * 8/2019 Carlson .................. F17C 5/007
(Continued)

FOREIGN PATENT DOCUMENTS

EP          2169507        11/2015
KR       1020160005500     1/2016

OTHER PUBLICATIONS

Notification of and the International Preliminary Report on Patentability Chapter II for PCT/US2019/043051; dated Apr. 16, 2021.
Claims for the International Preliminary Report on Patentability Chapter II for PCT/US2019/043051; dated Apr. 16, 2021.
Notification of Transmittal of International Search Report and The Written Opinion of The International Searching Authority for PCT/US2019/043051; dated Nov. 7, 2019.
(Continued)

*Primary Examiner* — Yonel Beaulieu
(74) *Attorney, Agent, or Firm* — Tope-McKay & Associates

(57) ABSTRACT

Described is a system for online vehicle recognition in an autonomous driving environment. Using a learning network comprising an unsupervised learning component and a supervised learning component, images of moving vehicles extracted from videos captured in the autonomous driving environment are learned and classified. Vehicle feature data is extracted from input moving vehicle images. The extracted vehicle feature data is clustered into different vehicle classes using the unsupervised learning component. Vehicle class labels for the different vehicle classes are generated using the supervised learning component. Based on a vehicle class label for a moving vehicle in the autonomous driving environment, the system selects an action to be performed by the autonomous vehicle, and causes the
(Continued)

selected action to be performed by the autonomous vehicle in the autonomous driving environment.

21 Claims, 10 Drawing Sheets

(51) Int. Cl.
    *G08G 1/16*          (2006.01)
    *G06K 5/00*          (2006.01)
    *G06K 7/00*          (2006.01)
    *G06N 20/00*        (2019.01)
    *G05D 1/02*         (2020.01)
    *G05B 13/02*        (2006.01)

(58) Field of Classification Search
    CPC ......... G05B 13/00; G05B 2219/31003–31008; G06N 20/00; G06K 5/00; G06K 7/00; G08G 1/00; G08G 1/16
    See application file for complete search history.

(56) References Cited

U.S. PATENT DOCUMENTS

| | | | |
|---|---|---|---|
| 10,423,162 B2* | 9/2019 | La | G08G 1/149 |
| 10,710,633 B2* | 7/2020 | Carlson | G05D 1/0274 |
| 10,870,430 B2* | 12/2020 | Relihan | G08G 1/09675 |
| 11,017,318 B2* | 5/2021 | Tsuji | G06N 20/00 |
| 11,022,971 B2* | 6/2021 | Penna | G05D 1/0212 |
| 2003/0147558 A1* | 8/2003 | Loui | G06K 9/6226 382/225 |
| 2015/0363690 A1 | 12/2015 | Modha | |
| 2016/0247394 A1* | 8/2016 | Stenneth | G07C 5/008 |
| 2021/0089040 A1* | 3/2021 | Afrouzi | A47L 9/2894 |

OTHER PUBLICATIONS

International Search Report of The International Searching Authority for PCT/US201 9/043051; dated Nov. 7, 2019.
Written Opinion of The International Searching Authority for PCT/US2019/043051; dated Nov. 7, 2019.
Hoang-Hon Trinh, Manh-Dung Ngo, and Van-Tnyen, "HOG and geometric model based moving vehicle detection," IEEE Conference on Industrial Electronics and Applications, pp. 1900-1904, 2017.
Zhenyu Gao, Ziqi Zhoa, and Xiaoting Sun, "Vehicle detection and tracking based on optical field," IEEE International Conference on Security, Pattern Analysis and Cybernetics, pp. 626-630, 2017.
A. Kamann, J. B. Bielmeier, S. Hasirloglu, U. T. Schwars, and T. Brandmeier, "Object tracking based on extended Kalman filter in high dynamic driving situations," IEEE International Conference on Intelligent Transportation System, pp. 1-6, 2017.
Liu Yang, Wang Zhong-li, and Cai Bai-gen, "An intelligent vehicle tracking technology based on SURF feature and mean-shift algorithm," IEEE International Conference on Robotics and Biomimetics, pp. 1224-1227, 2014.
N. Dalal, and B. Triggs, "Histogram of oriented gradients for human detection," IEEE Conference on Computer Vision and Pattern Recognition, vol. 1, pp. 886-893, 2005.
Kirill Minkovich, Corey M. Thibeault, Michael John O'Brien, Aleksey Nogin, Youngkwan Cho, and Narayan Srinivasa, "HRLSim: A High Performance Spiking Neural Network Simulator for GPGPU Clusters," IEEE Transactions on Neural Networks and Learning Systems, vol. 25, No. 2, pp. 316-331, 2014.
Richard Rohwer, "Rank-1 Update Formula," May 5, 2011. at https://svn.ai.sri.com/projects/aa-svn/tools/ dynamics/reservoir/doc/rank1update.tex, pp. 1-3.

* cited by examiner

METHOD OF REAL TIME VEHICLE RECOGNITION WITH NEUROMORPHIC COMPUTING NETWORK FOR AUTONOMOUS DRIVING

CROSS-REFERENCE TO RELATED APPLICATIONS

This is a Non-Provisional application of U.S. Provisional Application No. 62/702,042, filed in the United States on Jul. 23, 2018, entitled, "A Method of Online Learning with Neuromorphic Computing Network," the entirety of which is incorporated herein by reference.

BACKGROUND OF INVENTION

(1) Field of Invention

The present invention relates to a system for vehicle recognition, and more particularly, to a system for vehicle recognition for autonomous driving.

(2) Description of Related Art

Online learning capability is very important for many machine learning systems and autonomous systems. For instance, real-time vehicle recognition is an important capability for autonomous driving systems. Autonomous vehicles need to recognize the vehicles moving around them in order to accurately track their movements, such as changing lanes, exiting a highway, entering a highway, and making turns. When new types of vehicles are on the road, autonomous vehicles need to learn and recognize the new vehicles online and in real time. This requires that autonomous driving systems have online learning capability for real-time vehicle recognition.

Deep learning is the most popular learning technique, but it has no unsupervised learning capability. As a result, it needs more training samples to learn in supervised learning. In addition, deep learning is required to fully retrain the learning system for learning new objects and object classes. Therefore, deep learning techniques may not be good for online vehicle recognition in autonomous driving.

Thus, a continuing need exists for a system and method for online vehicle recognition for autonomous driving systems.

SUMMARY OF INVENTION

The present invention relates to a system for vehicle recognition, and more particularly, to a system for vehicle recognition for autonomous driving. The system comprises one or more processors and a non-transitory computer-readable medium having executable instructions encoded thereon such that when executed, the one or more processors perform multiple operations. Using a learning network comprising an unsupervised learning component and a supervised learning component, the system learns and classifies images of moving vehicles extracted from videos captured in the autonomous driving environment by: extracting vehicle feature data from input moving vehicle images; automatically clustering the extracted vehicle feature data into different vehicle classes using the unsupervised learning component; and generating vehicle class labels for the different vehicle classes using the supervised learning component. Based on a vehicle class label for one or more moving vehicles in the autonomous driving environment, an action to be performed by an autonomous vehicle is selected. The system causes the selected action to be performed by the autonomous vehicle in the autonomous driving environment.

In another aspect, the unsupervised learning component is a spiking reservoir network comprising a plurality of neurons, and the supervised learning component is a linear neural network classifier comprising a plurality of neurons.

In another aspect, each neuron in the spiking reservoir network is fully connected to the plurality of neurons in the linear neural network classifier, and wherein a set of synaptic weights between the spiking reservoir network and the linear neural network classifier is trained by a supervised learning method.

In another aspect, the linear neural network classifier uses averaged spiking rates from the spiking reservoir network to generate the vehicle class labels.

In another aspect, upon extracting features from an unknown moving vehicle image, the system generates an unknown vehicle identification signal; saves any images of the unknown moving vehicle; requests a new vehicle class label for the unknown moving vehicle when a number of saved images of the unknown vehicle reaches a threshold value; and learns the new vehicle class.

In another aspect, synaptic weights are saved following supervised learning, and wherein to learn new vehicle classes, the saved synaptic weights representing old vehicle classes are used as initial weights for unsupervised learning.

In another aspect, synaptic weights learned from new vehicle classes are combined with the saved synaptic weights, and wherein the combined synaptic weights are used for classification of both old vehicle classes and new vehicle classes.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
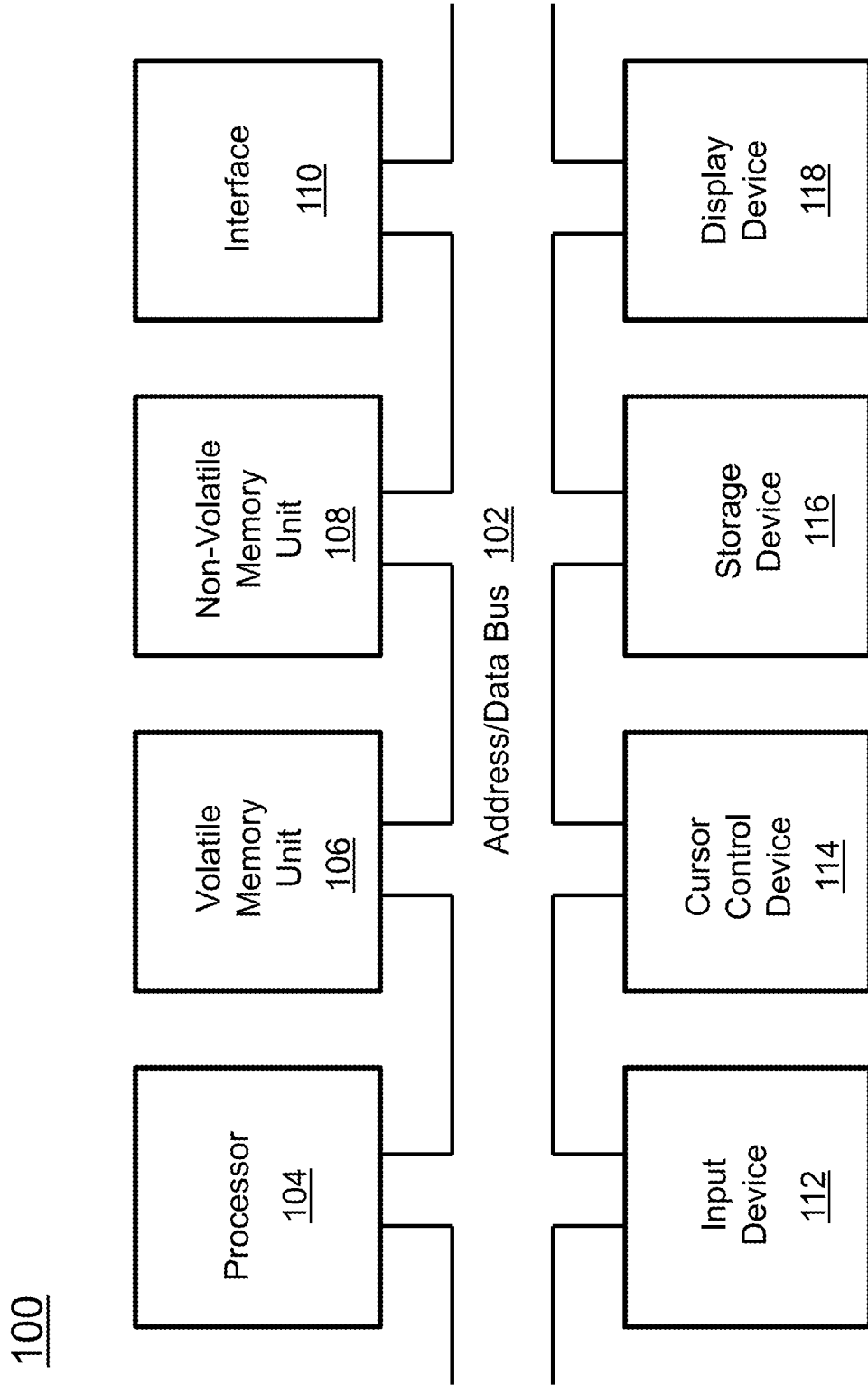
FIG. 1 is a block diagram depicting the components of a system for vehicle recognition according to some embodiments of the present disclosure.

The present invention relates to a system for vehicle recognition, and more particularly, to a system for vehicle recognition for autonomous driving. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Hoang-Hon Trinh, Manh-Dung Ngo, and Van-Tnyen, "HOG and geometric model based moving vehicle detection," IEEE Conference on Industrial Electronics and Applications, pp. 1900-1904, 2017.
2. Zhenyu Gao, Ziqi Zhoa, and Xiaoting Sun, "Vehicle detection and tracking based on optical field," IEEE International Conference on Security, Pattern Analysis and Cybernetics, pp. 626-630, 2017.
3. A. Kamann, J. B. Bielmeier, S. Hasirloglu, U. T. Schwars, and T. Brandmeier, "Object tracking based on extended Kalman filter in high dynamic driving situations," IEEE International Conference on Intelligent Transportation System, pp. 1-6, 2017.
4. Liu Yang, Wang Zhong-li, and Cai Bai-gen, "An intelligent vehicle tracking technology based on SURF feature and mean-shift algorithm," IEEE International Conference on Robotics and Biomimetics, pp. 1224-1227, 2014.
5. N. Dalal, and B. Triggs, "Histogram of oriented gradients for human detection," IEEE Conference on Computer Vision and Pattern Recognition, vol. 1, pp. 886-893, 2005.
6. Richard Rohwer, "Rank-1 Update Formula," 2011.
7. Kirill Minkovich, Corey M. Thibeault, Michael John O'Brien, Aleksey Nogin, Youngkwan Cho, and Narayan Srinivasa, "HRLSim: A High Performance Spiking Neural Network Simulator for GPGPU Clusters," IEEE Transactions on Neural Networks and Learning Systems," vol. 25, No. 2, pp. 316-331, 2014.

(2) Principal Aspects

Various embodiments of the invention include three "principal" aspects. The first is a system for vehicle recognition. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as performing the operations as described herein.

The computer system 100 may include an address/data bus 102 that is configured to communicate information. Additionally, one or more data processing units, such as a processor 104 (or processors), are coupled with the address/ data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
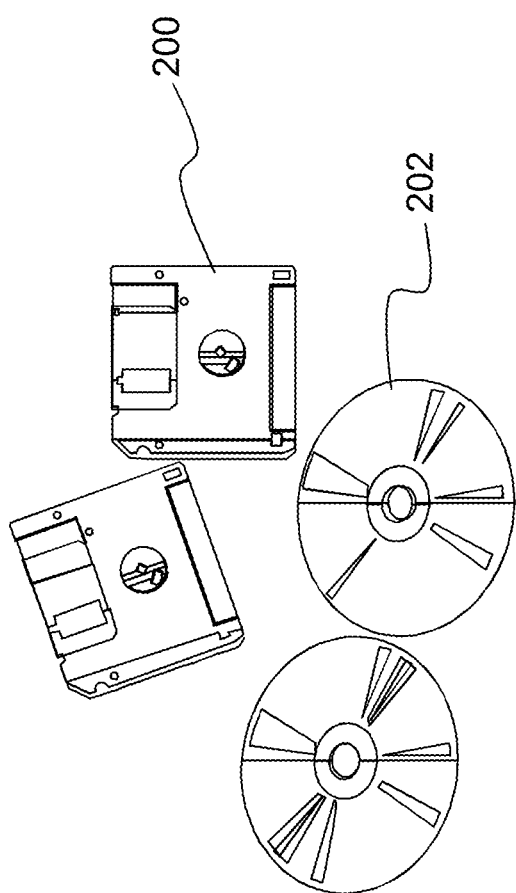
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Online learning is an important function required for autonomous driving systems, which need to constantly monitor the driving environment and learn new situations for vehicle driving safety. Online learning means learning on-the-go during operation of the vehicle, in the example of autonomous driving. Online learning often requires real-time processing capability. In contrast, offline learning involves training a learning system when the vehicle is not in operation. Described herein is a system and method for real-time vehicle recognition with online learning using neuromorphic computing networks. The method is primarily focused on two aspects of online learning: learning with a small training data set and learning new classes without fully retraining the learning system. The invention according to embodiments of the present disclosure includes a unique neuromorphic computing structure, which is able to achieve online learning for both unsupervised and supervised learning; and a learning method for learning new classes of vehicles without fully retraining the autonomous driving system.

As will be described in further detail below, the learning system described herein was tested with a publicly available Modified National Institute of Standards and Technology (MNIST) data set. Experimental results showed that the learning system performs better than the state-of-the-art technique, which is a deep learning method, in the two tasks of online learning: (1) learning with a small training data set; and (2) learning new things without fully retraining the system. Thus, the method and system described herein provides a marked technological improvement for real-time vehicle recognition for autonomous driving.

One of the most challenging issues in online learning is to learn from a small set of training samples. It is difficult to have a large set of training samples for an online learning system, which is generally required to achieve real-time computing. In autonomous driving applications, a large set of training samples may not be available or be too expensive to obtain. Another challenge in online learning is to learn new things without fully retraining the learning system, because the requirement of real-time computing prevents existing online learning systems from fully retraining the system when they have to learn new things, such as new types of vehicles.

In the approach according to embodiments of the present disclosure, the learning system is able to perform unsupervised learning automatically in real-time. Different vehicles in the input data are clustered into different categories by the unsupervised learning, and only a small set of training samples is needed to label the vehicle categories in supervised learning. When new vehicles are input into the system, new categories will be formed by the unsupervised learning process, and only a small set of new training samples is needed to label the new vehicle categories so that the system is able to learn new vehicle categories without fully retraining the system. Since the online learning system is based on a neuromorphic computing network, it is computationally more efficient compared to existing deep-learning-based methods.

Figure 3:
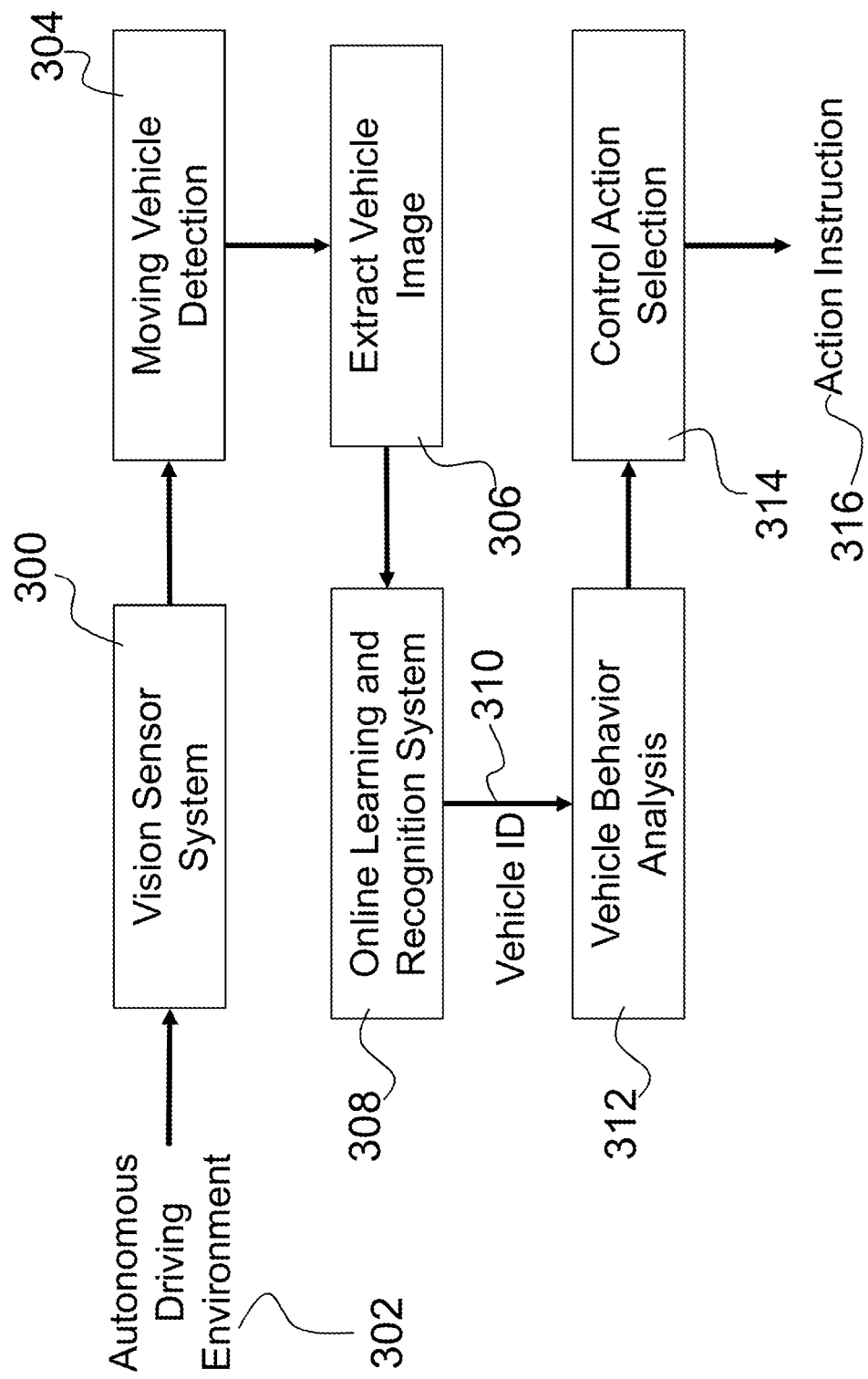
FIG. 3 is a diagram illustrating online vehicle recognition for autonomous driving according to some embodiments of the present disclosure.

FIG. 3 depicts a system diagram of real-time vehicle recognition for autonomous driving systems. The vehicle recognition system uses a Vision Sensor System 300 to capture videos of the autonomous driving environment 302. The functional block of Moving Vehicle Detection 304 is to detect moving vehicles in a driving environment. The functional block of Extract Vehicle Image 306 is to extract images of the detected moving vehicles. The functional block of Online Learning and Recognition System 308 is to learn and classify the detected moving vehicles. The behaviors of the identified moving vehicles (i.e., Vehicle Identification (ID) 310) are monitored and analyzed by the functional block of Vehicle Behavior Analysis 312. Based on the behaviors of the moving vehicles, the functional block of Control Action Selection 314 determines what action the autonomous vehicle will take for a given situation (i.e., action instruction 316), which can involve the control of position of the vehicle, speed (e.g., braking or acceleration operation), and/or maneuvering (e.g., steering operation).

The techniques for the first three functional blocks are mature; there are many known techniques that can be applied to achieve the functions of moving vehicle detection 304 and vehicle image extraction 306, such as those described in Literature Reference Nos. 1 and 2. For example, motion vectors and optical flow can be used to detect moving vehicles (such as described in Literature Reference No. 2), and segmenting motion vectors or optical flow fields can be used to find the bounding boxes of moving vehicles for extracting their images from the input video sequences.

Vehicle behavior analysis 312 can be achieved by tracking the vehicle movement, using standard techniques such as Kalman filters (see Literature Reference No. 3), and matching vehicle movements with a set of possible standard situations described by vehicle movements, such as changing lanes, making turns, and exiting the highway. Techniques to implement the function of control action selection 314 include the use of a look-up table that contains all possible pairs of situations and corresponding actions or a rule-based system. The most challenging function is the online learning and recognition 308 of the detected moving vehicles. The invention described herein provides a solution to this challenge.

To achieve online learning capability, the learning system has to have three properties: real-time computing, learning from a small set of training samples, and learning new vehicle classes without fully retraining the system. In the autonomous driving environment 302, using a large set of training samples is a challenging issue because the online learning and recognition system 308 generally can't afford the time for training the system with a large set of training samples. In most cases, a large set of training samples may not be available or be too expensive to obtain for the online learning. Therefore, the online learning and recognition system 308 requires learning techniques that can learn from a small set of training samples. Because of the requirement of real-time computing, the online learning system can't afford to fully retrain the system when it needs to learn new vehicle classes; this requires that the system has the capability to remember the old vehicle classes when it is trained to learn new vehicle classes.

One way to achieve online learning capability is to have both an unsupervised learning component and a supervised learning component in the online learning and recognition system 308. The unsupervised learning component plays a role of clustering the online data into different categories, which makes the supervised learning process easier; the supervised learning component only needs to label the categories obtained from the unsupervised learning with a small set of training data. In addition, the online learning and recognition system 308 needs a memory component to remember the old classes when it is trained to learn new classes.

Figure 4:
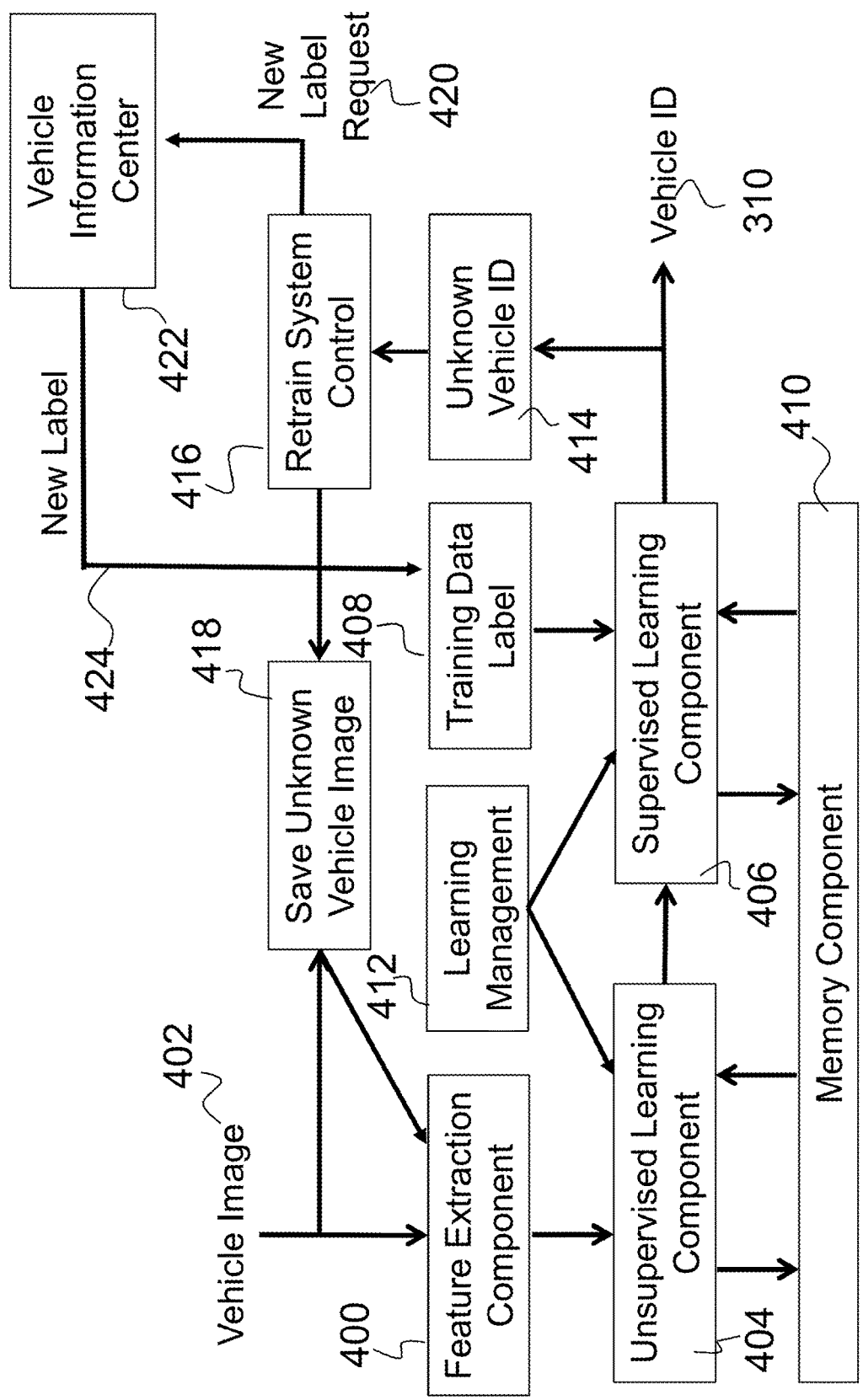
FIG. 4 is a diagram illustrating an online learning system according to some embodiments of the present disclosure.

FIG. 4 illustrates a system diagram of the online learning and recognition system 308 for real-time vehicle classification. The feature extraction component 400 extracts features/signatures from the input vehicle images 402; the unsupervised learning component 404 automatically clusters the features into different categories; and the supervised learning component 406 labels the categories with a small set of training data (i.e., training data label 408). The memory component 410 remembers both the categories and labels; when the system learns new classes, it doesn't need to retrain for the old classes.

In the online learning and recognition system 308 shown in FIG. 4, the feature extraction component 400 computes features from input vehicle images 402. The features can be image edges or image local statistics computed with a local window. For vehicle identification 310, Speeded Up Robust Features (SURF) (see Literature Reference No. 4) and Histogram of Oriented Gradients (HOG) (see Literature Reference No. 5) have proven to have good and robust performance. In terms of machine learning, the most important component is the online learning component (i.e., unsupervised learning component 404 and supervised learning component 406). The online learning function is achieved by two-step learning: unsupervised learning and supervised learning. The two-step learning is controlled by the functional block of Learning Management 412. When the system finds new vehicles (untrained before), the system generates an unknown vehicle ID 414 signal; and then, the Retrain System Control 416 component issues a signal to save the images of the unknown vehicles (i.e., save unknown vehicle image 418). When the number of the saved images reaches a predetermined threshold, the Retrain System Control 416 outputs a signal for requesting new labels (i.e., new label request 420) of the unknown vehicles. A vehicle information center (element 422) transmits (such as through an Internet connection) new labels (element 424) for the unknown vehicles into the system, and the system is trained for the unknown vehicles in online operation/off-line operation.

(3.1) Online Learning with Neuromorphic Computing Network

There are many approaches to implement the online learning. In the system according to embodiments of the present disclosure, neuromorphic computing networks are used to implement the online learning. There are several advantages of using neuromorphic computing networks compared to conventional neural networks. Neuromorphic computing networks are computationally very efficient in terms of energy consumption, since neuromorphic computing networks use spikes (signals with only 0 and 1) as signals, which consume less energy than digital signals (several-bits signals) and analog signals (continuous signals). Spiking signals contains electric signals of 0 and 1. When the signal is 0, it doesn't use electric power. In contrast, digital signals are quantized analog signals, which always use electric power. Only when they are transmitted are they encoded as 0s and 1s for each discrete value. When digital signals are processed, they are in discrete values (bits), not 0s and 1s. Neuromorphic computing networks can be implemented by spiking neuron circuits with highly parallel hardware, which enables real-time computing. Finally, spiking signals are able to capture temporal information embedded in the online vehicle data, and computing network structures are able to capture spatial signatures of the online vehicle data. Therefore, neuromorphic computing networks are able to process the spatial-temporal patterns in the vehicle data simultaneously.

Figure 5:
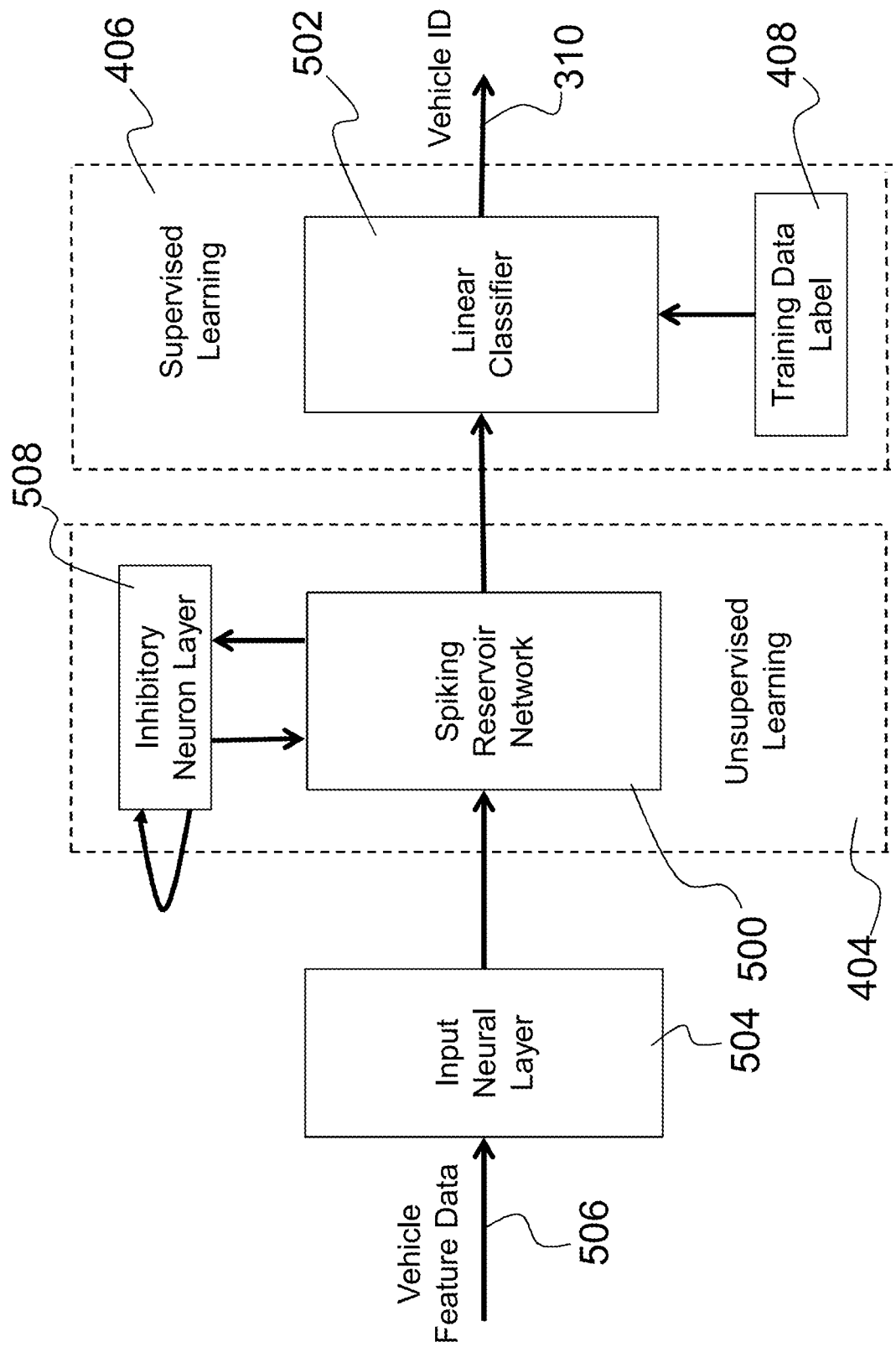
FIG. 5 is a diagram illustrating a neuromorphic-computing-based online learning system according to some embodiments of the present disclosure.

FIG. 5 illustrates the learning network according to embodiments of the present disclosure, which contains a spiking reservoir network 500 and a linear neural network classifier 502. The learning network contains two learning networks: an unsupervised learning component 404, which contains a spiking reservoir network 500, and a supervised learning component 406, which contains a linear classifier network 502. The unsupervised learning component 404 is trained first, and during the training of the supervised learning component 406, the synaptic weights of the unsupervised learning component 404 are fixed.

The function of the input neural layer 504 is to convert input vehicle feature data 506 into spikes. The connection between input vehicle features to the input neural layer 504 is a one-to-one connection with fixed connection weights, which means each feature component is connected to one neuron on the input neural layer 504 with a fixed synaptic weight. The size of the input neural layer 504 is the same as the size of input feature vectors. The input neural layer 504 converts the real values of input feature vectors into spiking sequences using exponential distribution/Poisson distribution. The real values of input feature vectors are used as mean values of exponential distribution, which is used to generate random numbers used as time intervals for generating spikes from the real values of input feature vectors. Mathematically, let x(m, n) be a real feature value for a neuron at position (m, n) on the input neural layer 504. A random number, k, is generated by a random number generator with the following exponential distribution function:

$$f(v) = \begin{cases} \lambda e^{-\lambda v}, & v \geq 0 \\ 0, & v < 0 \end{cases} \quad (1)$$

where λ=x(m, n). k is the output of the random number generator that is controlled by the distribution function given in Equation (1). The neuron at position (m, n) generates a sequence of spikes with the time interval equal to the number, k. If input feature value changes, a new time interval is generated by the exponential distribution. Therefore, input feature values generate a sequence of spikes for every neuron on the input neural layer 504. Every neuron on the input neural layer 504 is randomly connected to the spiking reservoir network 500 with a pre-determined connection probability and the synaptic weight is learned by spike-time-dependent plasticity (STDP) learning rule, which is an unsupervised learning method.

The spiking reservoir network 500 consists of excitatory neurons that are randomly connected to each other with a predetermined connection probability, and the synaptic weights in the layer are learned by STDP learning. To control the neuron firing rates, an inhibitory neuron 508 layer of inhibitory neurons is connected to the spiking reservoir network 500. The synaptic weights between the excitatory neurons and inhibitory neurons are learned by STDP learning. The inhibitory neurons are also connected to each other with a predetermined probability, and the connection weights are learned with STDP learning. Every neuron in the spiking reservoir network 500 is fully connected to the neurons in the linear classifier 502 layer. The synaptic weights between the spiking reservoir network 500 and the linear classifier 502 are trained by a supervised learning method called Rank-1 learning rule (see Literature Reference No. 6 for a description of the Rank-1 learning rule).

(3.2) Neuron Model and Unsupervised Learning

In the neuromorphic computing network described herein, every spiking neuron receives synaptic signals (spikes) from other neurons and releases synaptic signals (spikes) to other neurons. The neural dynamics for generating synaptic signals is modeled by the leaky integrate-and-fire (LIF) model, which is described by the following equation:

$$\tau_m \frac{du(t)}{dt} = -u(t) + RI(t). \quad (2)$$

The variable u(t) is the membrane potential; the variable I(t) is the membrane current; and the constants, $\tau_m$ and R, are the membrane time constant and resistance of the neuron, respectively. When the membrane potential of a neuron crosses a threshold value, the neuron releases a spiking signal (neuron firing) to other neurons. In terms of action on other neurons, a neuron is broadly classified as an inhibitory neuron or an excitatory neuron. An inhibitory neuron releases inhibitory synaptic signals, which cause a decrease in neuron firing on its target neurons, while an excitatory neuron releases excitatory synaptic signals, which cause an increase in neuron firing on its target neurons. The synaptic weights of the spiking reservoir network 500 are trained by an unsupervised learning, spike-timing-dependent plasticity (STDP), learning rule. The purpose of the unsupervised learning is to prepare the network for data classification. STDP learning is able to cluster online data into clusters (categories) that may facilitate the data classification process. During STDP learning, if $t_{pre}$ and $t_{post}$ are the spiking times for a pre-synaptic spike and a post-synaptic spike, the corresponding synaptic weight (synaptic conductance) is computed with Equations (3) to (5) below:

$$w_{new} = w_{old} + \Delta w \text{ and} \tag{3}$$

$$\Delta w = w_{max} F(\Delta t) \text{ with} \tag{4}$$

$$F(\Delta t) = \begin{cases} A_+ * \exp\left(\frac{\Delta t}{\tau_+}\right), & \text{if } \Delta t < 0 \\ -A_- * \exp\left(\frac{\Delta t}{\tau_-}\right), & \text{if } \Delta t \geq 0 \end{cases} \tag{5}$$

where $\Delta t = t_{pre} - t_{post}$. The constants, $A_+$ and $A_-$, determine the maximum amount of synaptic modification. The time constants, $\tau_+$ and $\tau_-$, determine the ranges of pre- to post-synaptic spike intervals. Basically, STDP learning rule says that if a pre-synaptic spike can generate a post-synaptic spike immediately, the synaptic weight is increased; otherwise, it is decreased. As a result, a high value in a synaptic weight means that the two neurons connected by the synaptic weight are closely coupled and are acting together. On the other hand, a small value in synaptic weight means that the activity of the two neurons have no impact on each other. STDP learning is able to capture the temporal correlations/patterns embedded in the online data.

(3.3) Supervised Learning

In the online learning system described herein, the function of supervised learning is completed by the linear classifier 502 layer, which uses averaged spiking rates to classify spiking sequences into vehicle ID 310. Since the unsupervised learning 404 clusters online data into different categories, the supervised learning 406 uses average spiking firing rates and some training data labels 408 to label the categories with vehicle IDs 310. Average spiking firing rates are calculated from the spiking sequences with a time-window. For a given time period, T, (presentation time of input spiking sequences), average firing rate is calculated by:

$$r_{avg}(m, n) = \frac{1}{T} \sum_{t}^{T} spk(m, n, t), \tag{6}$$

where the variable spk(m,n,t) is the spike generated by the neuron e(m, n) at time t.

There are many supervised learning methods. Since the unsupervised learning 404 method clusters the online data into different categories, which makes the task of supervised learning easier, a complicated/powerful classifier, such as support vector machine, is not needed for the supervised learning. In the approach described herein, the Rank-1 learning rule (see Literature Reference No. 6) is utilized for the supervised learning 406. The Rank-1 learning rule is an improved mean-squared learning rule. The idea of the Rank-1 learning rule is to map the training data into a subspace such that all common components in the training data have been removed before training the linear classifier 502. The mapping function can be obtained from the training data. Since common components in the training data have no effect in differentiating different classes, removing the common components in the training data makes the learning more efficient and effective. Mathematically, there is a weight matrix, W, that maps input spike rates, $r_i$, into target class, $c_i$, that is, $$c_i = W r_i, i = 1, 2, 3 \ldots, M. \tag{7}$$

The mapping error vector is calculated as follows:

$$e_i = c_i - t_i. \tag{8}$$

The input rate vector is mapped onto a subspace by a mapping matrix A given as follows:

$$k_i = A r_i. \tag{9}$$

The subspace vector is used to compute a gain factor by the following equation:

$$g_i = 1 + k_i^T r_i. \tag{10}$$

With the gain factor, the subspace mapping matrix A is updated as follows:

$$A = A - k_i \frac{k_i^T}{g_i}. \tag{11}$$

The weight matrix W is updated as follows:

$$W = W - e_i \frac{k_i^T}{g_i}. \tag{12}$$

The constant M in Equation (7) is the number of training samples; the weight matrix W is initialized to a very small value, such as 0.1 used in simulations. In Equation (8), the symbol $t_i$ is a class label vector for the training. The matrix A in Equation (9) is a mapping matrix, which is learned in the learning process from an initial value of 0.1. In Equation (10), the vector $k_i^T$ is the transpose of $k_i$. The class vector $c_i$ has multiple components; each vehicle ID 310 is related to one component. The class vector is classified to a vehicle ID 310 when its component has the maximal component value on the vehicle ID 310. If the maximal component value of the class vector is less than a predetermined threshold value, the class vector is classified as an unknown vehicle ID 414. The threshold value depends on the dynamic range of the synaptic weights and averaged neuron firing rates and can be estimated from the minimal critical component value for classifying each vehicle ID 310.

The Rank-1 learning rule removes common components in the training vectors when the mapping weight matrix W is learned since the common components have no contributions to the learning. The way to remove the common components in the training vectors is to map the training vectors into a subspace by the mapping matrix A, which is also learned during the training. In general, the Rank-1 learning rule is more robust than other learning rules such as least mean squared (LMS) learning rule.

(3.4) Learning Management

The learning management 412 component is to control the unsupervised learning 404 process and the supervised learning 406 process. In the unsupervised learning 404 process, when all of the training data are used or the synaptic weights are converged, the unsupervised learning 404 process is completed and all of the synaptic weights trained by the process are fixed. The weight convergence is defined by the following equation:

$$\max\left\{\frac{\Delta w_i}{w_i}\right\}_{i=1}^{N} < \delta \quad (13)$$

where the variable $w_i$ and $\Delta w_i$ are synaptic weight and its change; the number of N is the total number of the synaptic weights; and the variable $\delta$ is a predetermined weight change rate. The predetermined weight change depends on the dynamic range of synaptic weights. In the simulations described below, $\delta$ was set to 0.03. The weight convergence can be controlled by adjusting the STDP parameters and neuron firing rates. In general, a slow weight convergence is good for the learning process. The supervised learning 406 process starts after the unsupervised learning 404 process and is completed when all of labeled training data are used. After the supervised learning 406 process, all of synaptic weights connected to the output layer (linear classifier 502) are fixed during online vehicle ID 310 classification.

(3.5) Online Learning New Classes

Figure 6:
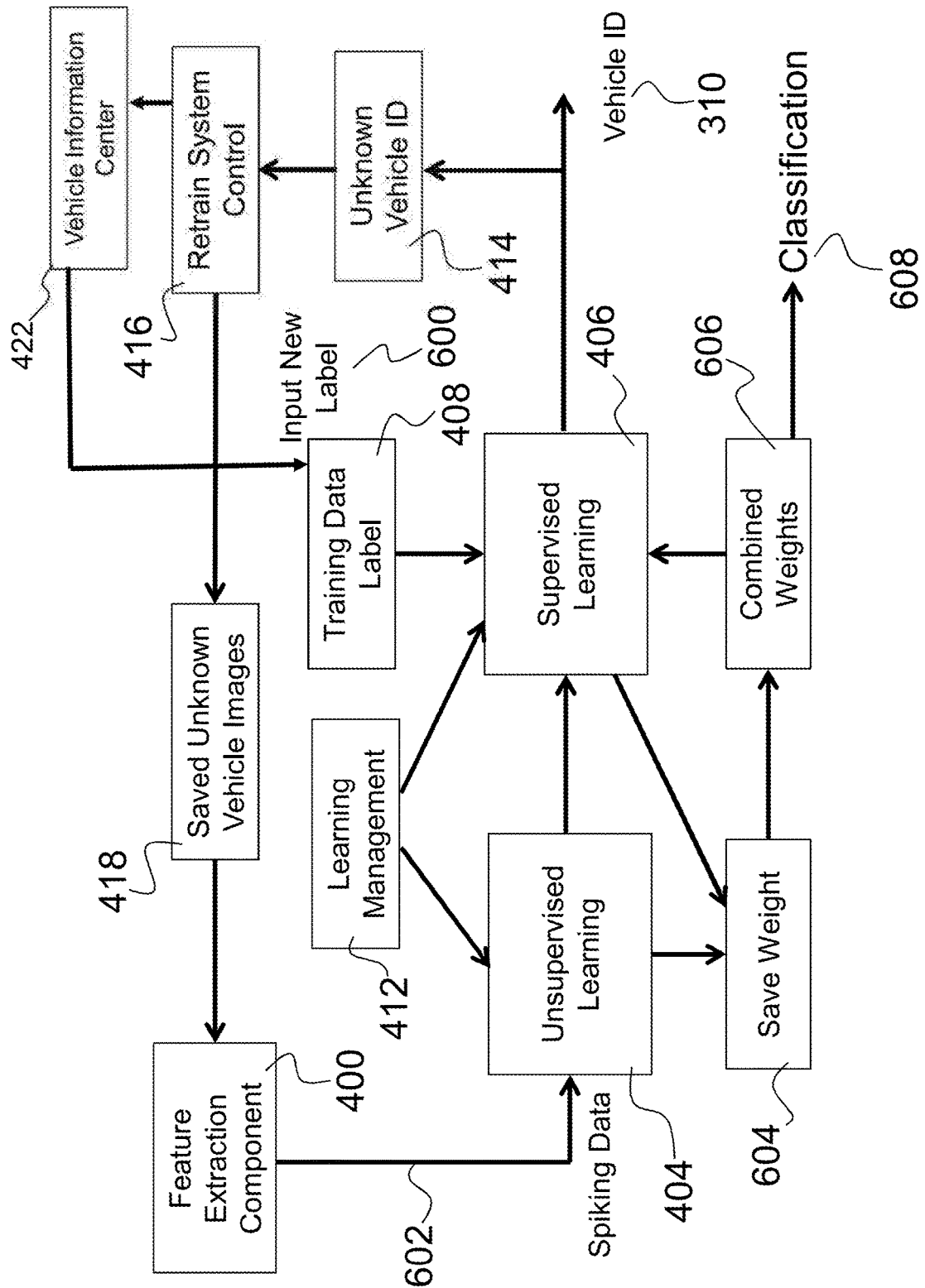
FIG. 6 is a diagram illustrating learning of new classes according to some embodiments of the present disclosure.

An important property for the online learning approach described herein is to learn new classes without fully retraining the learning system. This requires that the learning system has the capability of remembering the classes learned before and is able to add new classes into the memory system. FIG. 6 illustrates a diagram of learning new classes with the online learning system. After the system user inputs new vehicle labels 600 into the system, the system starts the learning process, including the unsupervised learning 404 and the supervised learning 406 processes, with the saved unknown vehicle images 418. The feature extraction component 400 extracts image features from the saved unknown images 418 and converts feature vectors into spiking sequences (i.e., spiking data 602). The learning management component 412 controls the unsupervised learning component 404 and supervised learning component 406 for the saved unknown vehicle images 418.

Every time after the system conducts the supervised learning 406, the system saves the synaptic weights 604. To learn new vehicle classes, the unsupervised learning component 404 uses the saved synaptic weights 604, which represent old classes, as initial weights for the learning. The unsupervised learning process will add new clusters into the saved synaptic weights 604 for categorizing the new classes. In the supervised learning component 406, the neural weights are randomly initialized. The learning process will learn the weights with new class data, and after the supervised learning process, the weights learned from new class data will be combined with the saved weights learned from old classes (i.e., combined weights 606). The combined weights 606 are used for classification 608 of both the old classes and new classes. In this way, when learning new classes, the system is only trained by the new class data, not the old class data, but the system is able to identify both the new class data and old class data.

After the supervised learning process, large values in the neural weights represent the new class data, and it is also true for the old class data. In experimental tests, neural weight values varied from 0 to 256. In general, a value of neural weights larger than the mean value (e.g., 128) is considered a large value. However, a specific weight value is not significant; it is the concept of a large weight value representing the importance of the neural weight for the given class that is important. After the learning, the larger the value of the weight is, the more important the weight is for representing the given class data. The method to combine the neural weights 606 is to keep significant values of the neural weights. Let $A_{old}=[a_{old}(i,j)]$ and $A_{new}[a_{new}(i,j)]$ be neural weights for the old classes and new classed, respectively, the combined neural weights 606, $A_{cmb}[a_{cmb}(i,j)]$, are calculated by the following equation:

$$a_{cmb}(i, j) = \begin{cases} a_{old}(i, j) & \text{if } a_{old}(i, j) > a_{new}(i, j) \\ a_{new}(i, j) & \text{otherwise.} \end{cases} \quad (14)$$

During the supervised learning 406 process, the synaptic weights learned from the unsupervised learning 404 are fixed. In autonomous driving conditions, new classes of vehicles are first classified as unknown classes. The autonomous systems will send a request to autonomous driving information centers for new labels of the unknown classes. After receiving the new labels, the autonomous driving system will automatically learn the new classes with the online learning process for the new classes.

(3.6) Experimental Studies

Figure 7:
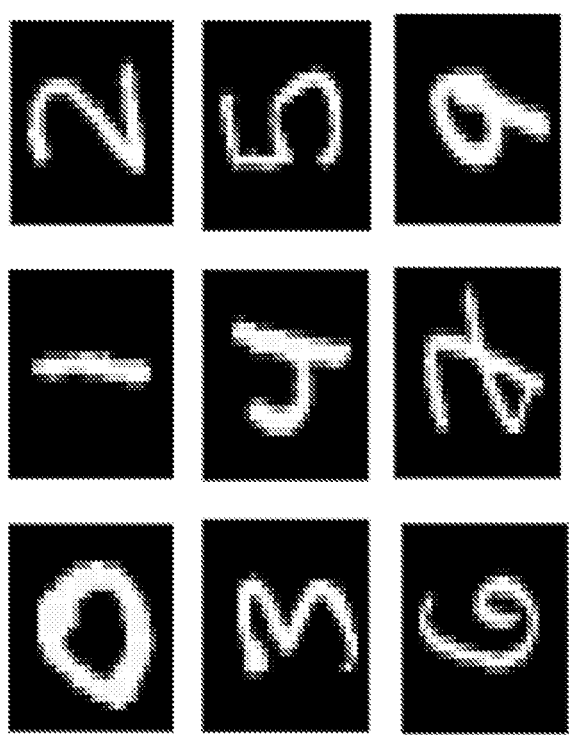
FIG. 7 is an illustration of a sample of Modified National Institute of Standards and Technology (MNIST) data according to some embodiments of the present disclosure.

To evaluate the real-time vehicle recognition system according to embodiments of the present disclosure, the capability of the online learning and recognition system was evaluated. The online learning and recognition system, shown in FIGS. 5 and 6, with a neuromorphic computing simulator (e.g., HRL SimGen3 (see Literature Reference No. 7) was used with a publically available MNIST data set to evaluate the system described herein. The MNIST data set contains hand-written digital numbers from 0 to 9. FIG. 7 shows a sample of the MNIST data set. Each digital number is represented by a 24×24 2-Dimensional array. There are 60,000 digital numbers in the training data and 10,000 digital numbers in the testing data. The main challenge of the MNIST data is the distortion of hand-written digital numbers. Since the data set contains no noise and the images of the digital numbers are simple, instead of using the features of the images, in experimental tests the original images were used as input to the spiking reservoir network 500 shown in FIG. 5.

To process the 24×24 digital images, the input neural layer 504 has 24×24 excitatory neurons. The spiking reservoir network 500 has 3000 excitatory neurons; the inhibitory layer 508 has 750 inhibitory neurons and the linear classifier 502 has 5 neurons. Each neuron in the input layer 504 is connected to the spiking reservoir network 500 with a connection probability of 0.02, which means each neuron in the input layer 508 is randomly connected to the 2 percent of the neurons in the spiking reservoir network 500. Each neuron in the spiking reservoir network 500 is randomly connected to the neurons in the inhibitory layer 508 with a connection probability of 0.07; each neuron in the inhibitory layer 508 is randomly connected to the neurons in the spiking reservoir network 500 with a connection probability of 0.32; and the neurons in the inhibitory layer 508 are randomly connected to each other with a connection probability of 0.08.

To test the capability of learning with a small set of training data, digit 0-4 data was used to evaluate the system. For 0-4 digits, there are 30569 training images and 5000 testing images in the data set. Only a small portion of the training images were used to train the system, and the 5000 testing images were used to test the system.

Figure 8:
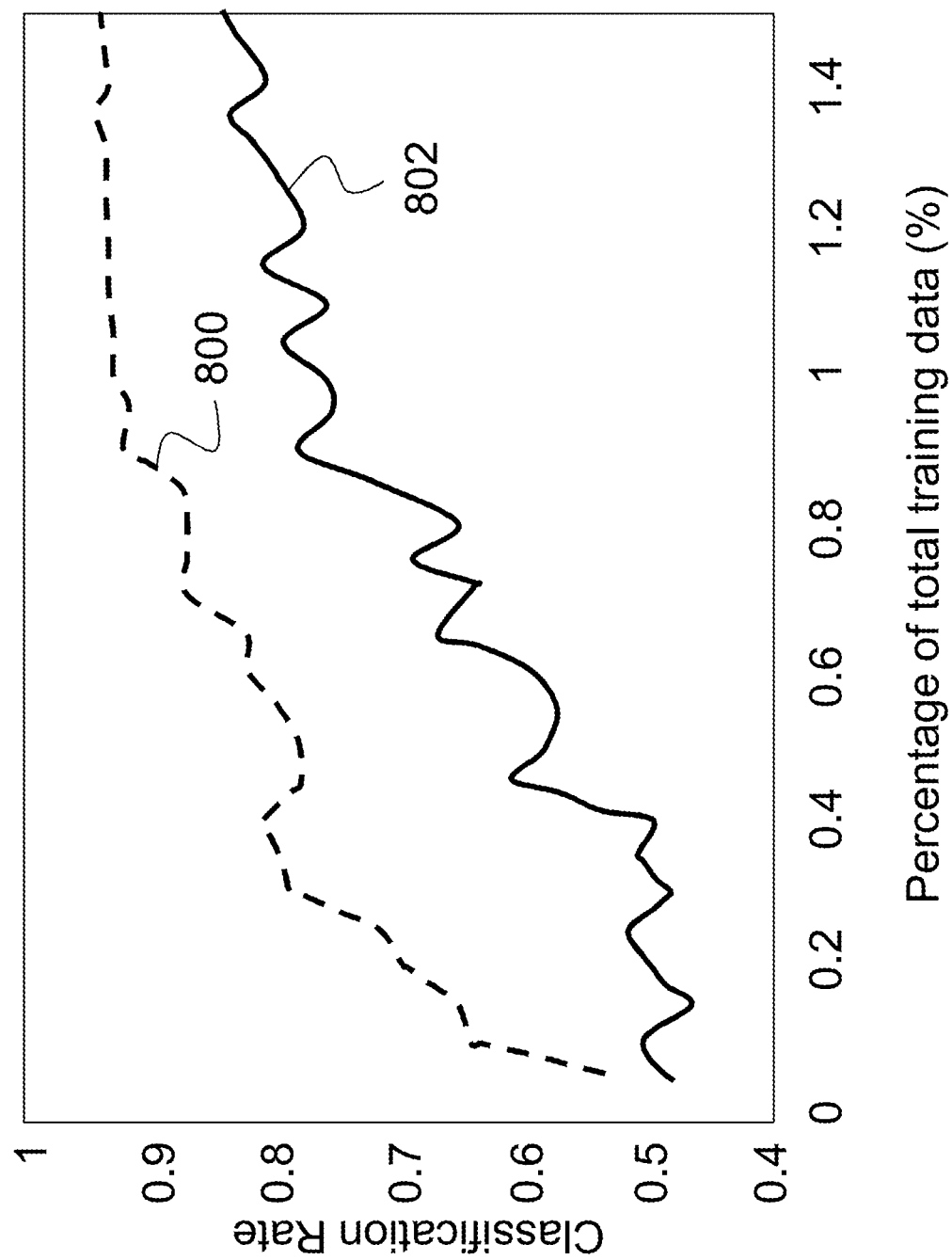
FIG. 8 is a plot illustrating classification results of learning with a small set of training data according to some embodiments of the present disclosure.

The results of the system described herein were compared with ones obtained from a deep learning technique (Matlab autoencoder.m). The deep learning technique has three stacked autoencoders and one soft-max layer. The plot in FIG. 8 summarizes the results of the invention and the deep learning method. In FIG. 8, the dashed line 800 represents the results produced by the learning system according to embodiments of the present disclosure. The system uses unsupervised learning (learning STDP) to prepare the network for supervised classification; it only needs a small set of training data for the supervised learning. The solid line 802 represents the results produced by the deep learning technique. The x-axis is the percentage of the total training data (30568 digit images) used in the supervised training, and the y-axis is the classification rate. FIG. 8 shows that the learning system described herein is much better than the deep learning technique in the situation where only a small set of training data is used for the supervised learning. For the results shown in the figure, the learning system used 1000 digit images (training images without labels) in the unsupervised learning (learning STDP) phase. The deep learning technique has no unsupervised learning capability. With a large set of training data, the deep learning can improve its classification rate significantly.

To test the capability of learning new classes without fully retraining the system, 0-4 digits were used as old classes to train the learning system, and 5-9 digits were used as new classes to train the system. Ten neurons in the linear classifier 502 layer for identifying ten classes. First, the system was trained to identify the old classes (0-4 digits) in both the unsupervised learning and supervised learning. Then, new classes 5-9 data was used to train the system again. Finally, 0-9 data was used to evaluate the system.

Figure 9:
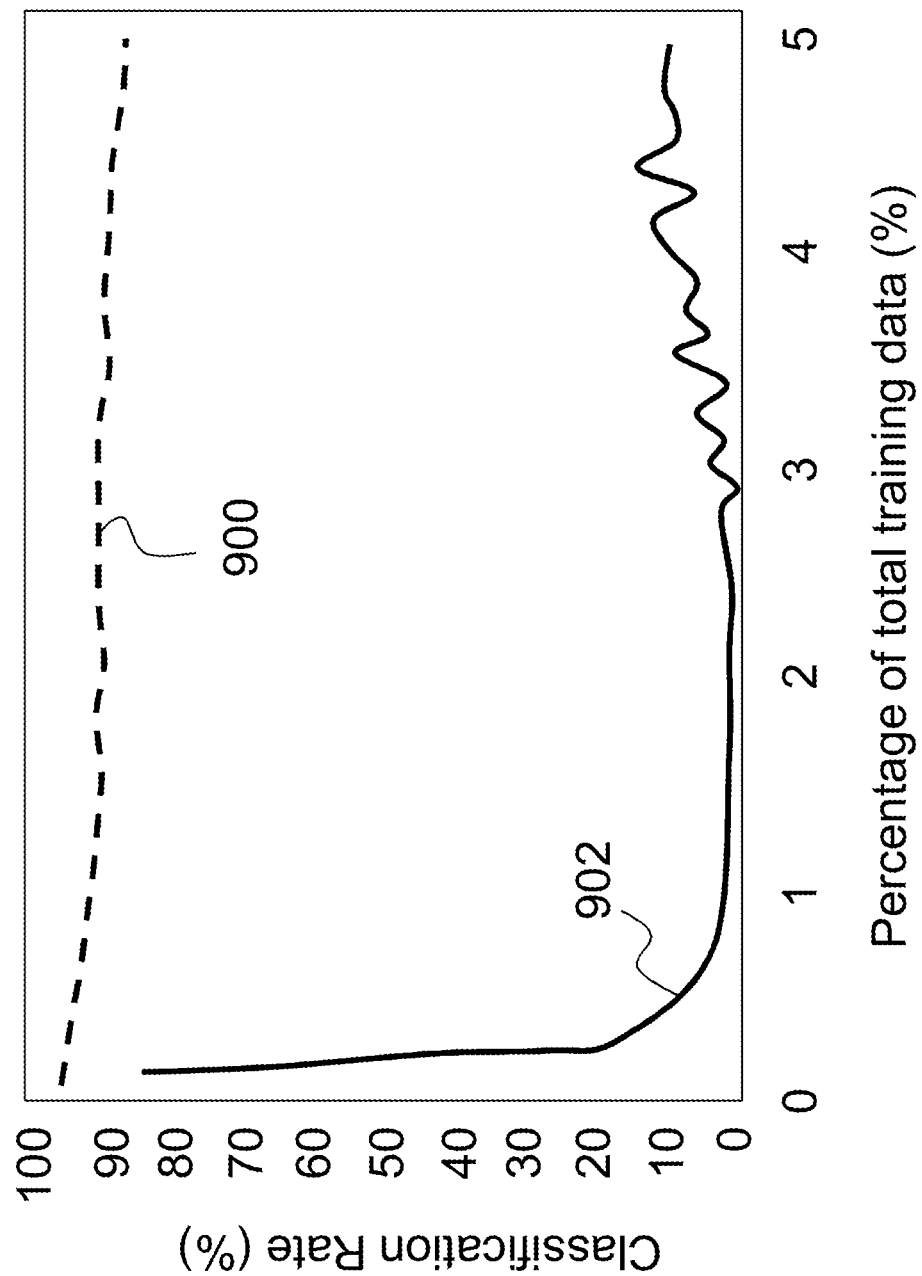
FIG. 9 is a plot illustrating classification results of classifying old classes (0-4 digits) according to some embodiments of the present disclosure.

In the learning of the old classes, 5% of the training data was utilized for learning digits 0-4. In the learning of new classes (5-9 digits), the percentage of the training data was changed from 0.5 percent to 5 percent. The capability of identifying the old classes and new classes was evaluated. The system described herein was also compared with the deep learning technique. FIG. 9 depicts a plot of the results of identifying the old classes (0-4 digits) after the system is trained with 5-9 digit data comparing the invention (represented by dashed line 900) and the deep learning technique (represented by solid line 902). For the present invention, as the training data (5-9 digits) increases, the system capability of identifying 0-4 digits (old classes) decreases slightly. When the training data (5-9 digits) is small, the deep learning technique still contains 0-4 digit information (previous training), and the classification rate is high. When training data (5-9) increases, the system quickly forgets the information of 0-4 digits, and the classification rate of 0-4 digits drops quickly. The solid line 902 represents the classification results produced by the prior art deep learning technique, and it clearly shows that the deep learning technique has no remembering capability after it is trained by the new classes.

Figure 10:
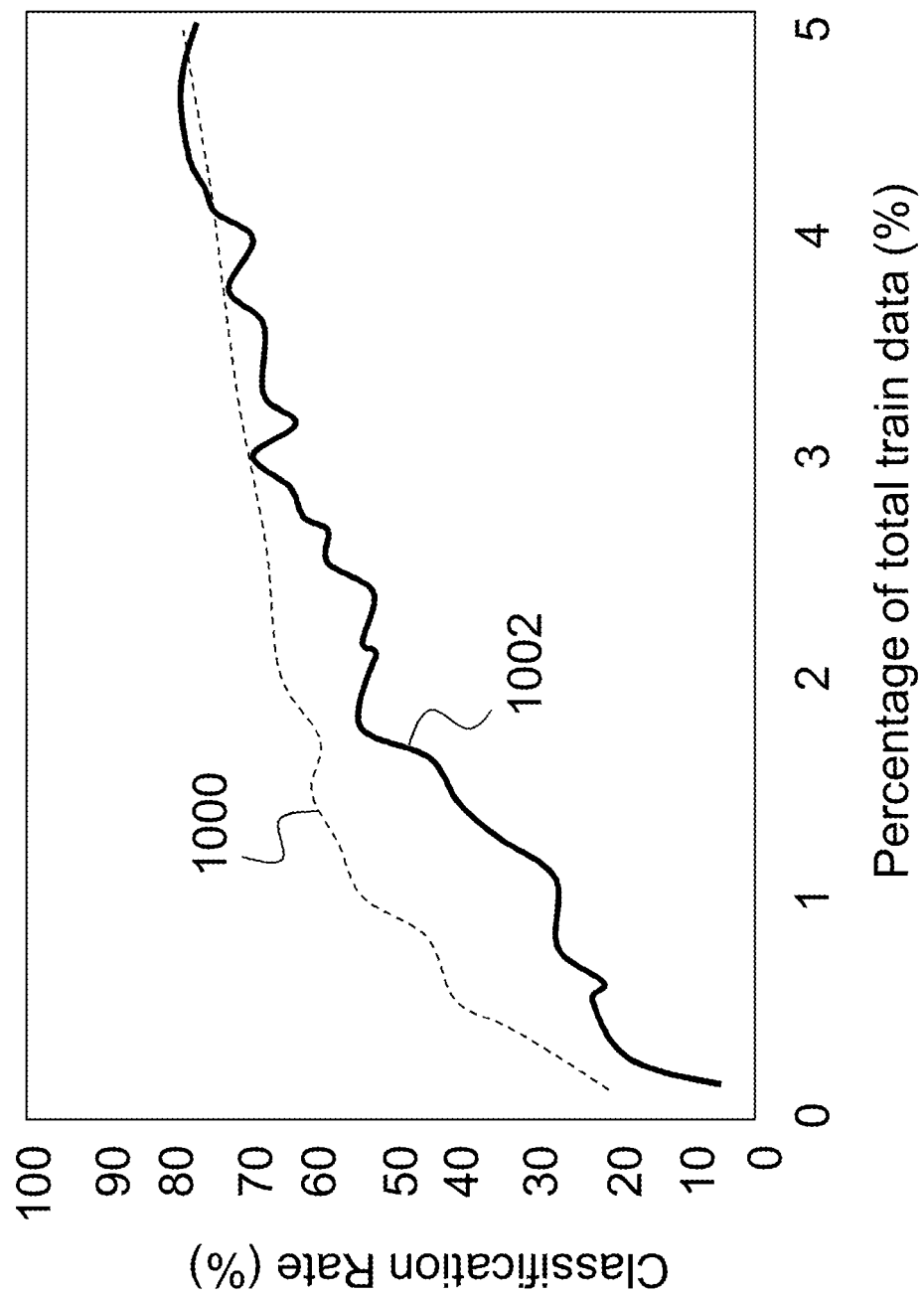
FIG. 10 is a plot illustrating classification results of classifying new classes (5-9 digits) according to some embodiments of the present disclosure.

In FIG. 10, the y-axis is the classification rate and the x-axis is the percentage of the training data used in the supervised learning. The dashed line 1000 represents the classification rates produced by the learning system described herein; it shows that after the system is trained by new classes, 5-9 digit data, it still can remember the old classes, 0-4 digits. FIG. 10 summarizes the classification results on the new classes, 5-9 digit data. The dashed line 1000 represents the results produced by the learning system according to embodiments of the present disclosure, while the solid line 1002 represents the results produced by the deep learning technique. After the learning systems are trained with the new classes data (5-9 digits), both the learning systems (the invention and the deep learning system) can achieve good classification rates on the new classes, but the learning system described herein can deliver better classification rates at a lower percentage of the training data (i.e., less than 3% of the training data).

In summary, the system described herein is able to achieve supervised online learning of vehicle classes with a small set of labeled training samples and learn new vehicle classes without fully retraining the system. The learning and recognition system contains an unsupervised learning component and a supervised component. It uses a neuromorphic computing network to achieve the unsupervised learning for clustering online data into different categories, which makes the supervised learning component easier, labeling the categories with a small set of training samples. Furthermore, the learning and recognition system uses a simple and efficient linear classifier to achieve supervised learning in the supervised learning component. Experimental tests show that the online learning system according to embodiments of the present disclosure is effective to achieve (1) supervised learning with a small set of training data, and (2) learning of new classes without fully retraining the system. The system performs better than the deep learning technique in terms of the two learning capabilities on the MNIST data set.

Online learning capability is very important for many machine learning systems and autonomous systems since it will enable machine learning systems and autonomous systems to adaptively learn new things in a dynamically changing environment. Therefore, the invention will benefit vehicle manufacturers in many of their applications, such as vehicle tracking, vehicle behavior analysis, and vehicle action/driver's intension prediction.

Finally, while this invention has been described in terms of several embodiments, one of ordinary skill in the art will readily recognize that the invention may have other applications in other environments. It should be noted that many embodiments and implementations are possible. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for online vehicle recognition in an autonomous driving environment, the system comprising:
   one or more processors and a non-transitory memory having instructions encoded thereon such that when the instructions are executed, the one or more processors perform operations of:
   using a learning network comprising an unsupervised learning component and a supervised learning component, learning and classifying images of moving vehicles extracted from videos captured in the autonomous driving environment by:

using at least one of motion vectors and optical flows to detect moving vehicles in an input video sequence of the autonomous driving environment;

extracting vehicle feature data from the input video sequence by segmenting the motion vectors or optical flows to find bounding boxes of moving vehicles for extracting images of the moving vehicles from the input video sequence;

automatically clustering the extracted vehicle feature data into different vehicle classes using the unsupervised learning component; and generating vehicle class labels for the different vehicle classes using the supervised learning component; and selecting an action to be performed by an autonomous vehicle based on a vehicle class label for one or more moving vehicles in the autonomous driving environment; and causing the selected action to be performed by the autonomous vehicle in the autonomous driving environment.

2. The system as set forth in claim 1, wherein the unsupervised learning component is a spiking reservoir network comprising a plurality of neurons, and the supervised learning component is a linear neural network classifier comprising a plurality of neurons.

3. The system as set forth in claim 2, wherein each neuron in the spiking reservoir network is fully connected to the plurality of neurons in the linear neural network classifier, and wherein a set of synaptic weights between the spiking reservoir network and the linear neural network classifier is trained by a supervised learning method.

4. The system as set forth in claim 2, wherein the linear neural network classifier uses averaged spiking rates from the spiking reservoir network to generate the vehicle class labels.

5. The system as set forth in claim 1, wherein upon extracting features from an unknown moving vehicle image, the one or more processors perform operations of:

generating an unknown vehicle identification signal;
saving any images of the unknown moving vehicle;
requesting a new vehicle class label for the unknown moving vehicle when a number of saved images of the unknown vehicle reaches a threshold value; and
learning the new vehicle class.

6. The system as set forth in claim 2, wherein synaptic weights are saved following supervised learning, and wherein to learn new vehicle classes, the saved synaptic weights representing old vehicle classes, are used as initial weights for unsupervised learning.

7. The system as set forth in claim 6, wherein synaptic weights learned from new vehicle classes are combined with the saved synaptic weights, and wherein the combined synaptic weights are used for classification of both old vehicle classes and new vehicle classes.

8. A computer implemented method for online vehicle recognition in an autonomous driving environment, the method comprising an act of:

causing one or more processers to execute instructions encoded on a non-transitory computer-readable medium, such that upon execution, the one or more processors perform operations of:

using a learning network comprising an unsupervised learning component and a supervised learning component, learning and classifying images of moving vehicles extracted from videos captured in the autonomous driving environment by:

using at least one of motion vectors and optical flows to detect moving vehicles in an input video sequence of the autonomous driving environment;

extracting vehicle feature data from the input video sequence by segmenting the motion vectors or optical flows to find bounding boxes of moving vehicles for extracting images of the moving vehicles from the input video sequence;

automatically clustering the extracted vehicle feature data into different vehicle classes using the unsupervised learning component; and generating vehicle class labels for the different vehicle classes using the supervised learning component; and selecting an action to be performed by an autonomous vehicle based on a vehicle class label for one or more moving vehicles in the autonomous driving environment; and causing the selected action to be performed by the autonomous vehicle in the autonomous driving environment.

9. The method as set forth in claim 8, wherein the unsupervised learning component is a spiking reservoir network comprising a plurality of neurons, and the supervised learning component is a linear neural network classifier comprising a plurality of neurons.

10. The method as set forth in claim 9, wherein each neuron in the spiking reservoir network is fully connected to the plurality of neurons in the linear neural network classifier, and wherein a set of synaptic weights between the spiking reservoir network and the linear neural network classifier is trained by a supervised learning method.

11. The method as set forth in claim 9, wherein the linear neural network classifier uses averaged spiking rates from the spiking reservoir network to generate the vehicle class labels.

12. The method as set forth in claim 8, wherein upon extracting features from an unknown moving vehicle image, the one or more processors perform operations of:

generating an unknown vehicle identification signal;
saving any images of the unknown moving vehicle;
requesting a new vehicle class label for the unknown moving vehicle when a number of saved images of the unknown vehicle reaches a threshold value; and
learning the new vehicle class.

13. The method as set forth in claim 9, wherein synaptic weights are saved following supervised learning, and wherein to learn new vehicle classes, the saved synaptic weights representing old vehicle classes, are used as initial weights for unsupervised learning.

14. The method as set forth in claim 13, wherein synaptic weights learned from new vehicle classes are combined with the saved synaptic weights, and wherein the combined synaptic weights are used for classification of both old vehicle classes and new vehicle classes.

15. A computer program product for online vehicle recognition in an autonomous driving environment, the computer program product comprising:

computer-readable instructions stored on a non-transitory computer-readable medium that are executable by a computer having one or more processors for causing the processor to perform operations of:

using a learning network comprising an unsupervised learning component and a supervised learning component, learning and classifying images of moving vehicles extracted from videos captured in the autonomous driving environment by:

using at least one of motion vectors and optical flows to detect moving vehicles in an input video sequence of the autonomous driving environment;

extracting vehicle feature data from the input video sequence by segmenting the motion vectors or optical flows to find bounding boxes of moving vehicles for extracting images of the moving vehicles from the input video sequence;

automatically clustering the extracted vehicle feature data into different vehicle classes using the unsupervised learning component; and generating vehicle class labels for the different vehicle classes using the supervised learning component; and selecting an action to be performed by an autonomous vehicle based on a vehicle class label for one or more moving vehicles in the autonomous driving environment; and causing the selected action to be performed by the autonomous vehicle in the autonomous driving environment.

16. The computer program product as set forth in claim 15, wherein the unsupervised learning component is a spiking reservoir network comprising a plurality of neurons, and the supervised learning component is a linear neural network classifier comprising a plurality of neurons.

17. The computer program product as set forth in claim 16, wherein each neuron in the spiking reservoir network is fully connected to the plurality of neurons in the linear neural network classifier, and wherein a set of synaptic weights between the spiking reservoir network and the linear neural network classifier is trained by a supervised learning method.

18. The computer program product as set forth in claim 16, wherein the linear neural network classifier uses averaged spiking rates from the spiking reservoir network to generate the vehicle class labels.

19. The computer program product as set forth in claim 15, wherein upon extracting features from an unknown moving vehicle image, the one or more processors perform operations of:
generating an unknown vehicle identification signal;
saving any images of the unknown moving vehicle;
requesting a new vehicle class label for the unknown moving vehicle when a number of saved images of the unknown vehicle reaches a threshold value; and
learning the new vehicle class.

20. The computer program product as set forth in claim 16, wherein synaptic weights are saved following supervised learning, and wherein to learn new vehicle classes, the saved synaptic weights representing old vehicle classes, are used as initial weights for unsupervised learning.

21. The computer program product as set forth in claim 20, wherein synaptic weights learned from new vehicle classes are combined with the saved synaptic weights, and wherein the combined synaptic weights are used for classification of both old vehicle classes and new vehicle classes.

* * * * *